United States Patent [19]

Dangayach et al.

[11] Patent Number: 5,037,898

[45] Date of Patent: Aug. 6, 1991

[54] POLYSILOXANE-POLYLACTONE BLOCK COPOLYMER MODIFIED THERMOSTAT COMPOSITIONS

[75] Inventors: Kailash C. B. Dangayach; Ronald S. Bauer, both of Houston, Tex.

[73] Assignee: Shell Oil Company, Houston, Tex.

[21] Appl. No.: 185,670

[22] Filed: Feb. 27, 1990

[51] Int. Cl.$^5$ .................. C08G 77/42; C08G 81/00
[52] U.S. Cl. .................. 525/415; 525/476; 528/27; 523/466; 523/457; 523/458; 523/459; 523/460
[58] Field of Search .................. 525/415, 476; 528/27; 523/466

[56] References Cited

U.S. PATENT DOCUMENTS

| | | | |
|---|---|---|---|
| 3,154,597 | 10/1964 | McWhorter | 260/824 |
| 3,691,257 | 9/1972 | Kendrick et al. | 260/827 |
| 3,926,885 | 12/1975 | Keil | 260/29.1 |
| 4,202,811 | 5/1980 | Michael et al. | 260/37 |
| 4,262,043 | 4/1981 | Wald | 427/387 |
| 4,376,174 | 3/1983 | Itoh et al. | 523/435 |
| 4,604,435 | 8/1986 | Koshii et al. | 525/476 |
| 4,624,998 | 11/1986 | Keil | 525/476 |
| 4,663,413 | 5/1987 | Ward et al. | 528/26 |
| 4,675,361 | 6/1987 | Ward et al. | 525/92 |
| 4,701,482 | 10/1987 | Itoh et al. | 523/435 |
| 4,707,529 | 11/1987 | Hoffman et al. | 525/476 |
| 4,853,434 | 8/1989 | Block | 525/100 |
| 4,902,732 | 2/1990 | Itoh et al. | 525/433 |

FOREIGN PATENT DOCUMENTS

| | | |
|---|---|---|
| 0282977 | 3/1988 | European Pat. Off. |
| 2142794 | 3/1972 | Fed. Rep. of Germany |
| 63-120724 | 5/1988 | Japan |

*Primary Examiner*—John Kight, III
*Assistant Examiner*—Frederick Krass

[57] ABSTRACT

A polysiloxane-modified epoxy-based encapsulation composition comprising an epoxy resin, a curing agent for the epoxy resin, a polylactone-polysiloxane block copolymer, and a filler is described. The powder molding compositions provide a low internal stress epoxy composition without significantly sacrificing $T_g$.

38 Claims, No Drawings

POLYSILOXANE-POLYLACTONE BLOCK COPOLYMER MODIFIED THERMOSTAT COMPOSITIONS

BACKGROUND OF THE INVENTION

This invention relates to polysiloxane-modified epoxy resin compositions. In a specific aspect the invention relates to molding powder formulations from such compositions, suitable for use as encapsulates for semiconductor devices, and articles made from such formulations.

Encapsulation of semiconductors and other components with an epoxy resin, is widely used in the electronics industry to provide physical integrity and environmental protection to electrical components.

Encapsulation is generally a process in which an electrical component, or an assembly of small discrete units, is cast with, or imbedded in, a molten film, sheath, or foam of an encapsulation composition, which is then subjected to conditions effective to solidify the composition. Once the encapsulation composition is solidified, the encapsulated component will have physical integrity and environmental protection. The most commonly used encapsulation technique is transfer molding. In this process, the component to be encapsulated is placed into the cavity of a mold and an encapsulation composition, liquefied by heat and pressure, is forced into the cavity where it solidifies to encapsulate the component.

An encapsulating composition must not soften during the normal usage of the encapsulated component, must not develop excessive internal stress during the encapsulation process, and must have minimal moisture gain. An encapsulation composition that softens during the normal usage of the encapsulated component will jeopardize the integrity of the encapsulated component. The softening of the encapsulation composition during the normal usage of the encapsulated component can be prevented by incorporating into the composition an encapsulation resin with a sufficiency high glass transition temperature ($T_g$). Encapsulation compositions that develop high internal stress tend to break apart during normal usage. The trend in electronics technology is toward larger die sizes, increased capacity, smaller packages with higher pin counts and finer pitches, which in turn requires resins with low internal stress properties for very large scale integrated (VLSI) circuit chip encapsulation. Thus in encapsulation, as in many other epoxy applications, it is important that the composition used have low internal stress and high $T_g$.

The internal stress ($\sigma$) of a composition can be estimated by the following equation:

$$\sigma = k \int E \alpha dT$$

wherein E is the modulus of the material, k is a constant, T is temperature, and $\alpha$ is the coefficient of thermal expansion. Since the internal stress is proportional to both the modulus and the coefficient of thermal expansion, this suggests that the internal stress can be lowered by reducing the coefficient of thermal expansion, the modulus or both.

The common approach towards lowering internal stress has been to modify the epoxy resin with an elastomer. However, with increasing amounts of elastomer modifier, with filled or unfilled material, the modulus tends to decrease while the coefficient of thermal expansion tends to increase. Thus the reduction in internal stress is marginal due to the opposing trends of the modulus and the coefficient of thermal expansion. In addition, the $T_g$, which for encapsulation must generally be at least about 150° C., will many times vary proportionally with the modulus. Sometimes the lowering of the modulus results in too great a reduction in the $T_g$ for encapsulation application.

It is therefore an object of the invention to provide an epoxy-based encapsulation composition. In one embodiment, it is an object of the invention to provide a low internal stress epoxy composition without significantly sacrificing $T_g$. It is another object to provide molding powders and articles made therefrom.

BRIEF SUMMARY OF THE INVENTION

According to the invention, there is provided a composition comprising an epoxy resin, a curing agent for the epoxy resin, a polyactone-polysiloxane block copolymer, and a filler. Also according to the invention, there are provided molding powders made from such compositions and articles made from such molding powders. The molding powder compositions provide low internal stress epoxy compositions without significantly sacrificing $T_g$.

DETAILED DESCRIPTION OF THE INVENTION

The invention compositions include a polylactone-polysiloxane AB or ABA block copolymer. Although the invention is not limited to any particular polyactone-polysiloxane block copolymer, suitable block copolymers useful in the present invention are described in U.S. Pat. No. 4,663,413 and U.S. Pat. No. 3,691,257. In both AB and ABA type block copolymers, solubility parameters of the polysiloxane block B, will affect the selection of the polylactone block A. Preferably, for a polysiloxane segment at a solubility parameter of about 7 to about 8, more preferably about 7.3 to about 7.5, the solubility parameter of block A is preferably about 9 to about 10. The number average molecular weight ratio of all block A to B is preferably greater than or equal to 1 in order to obtain a block copolymer easily dispersible in the epoxy resin. Solubility parameter is defined as square root of energy of evaporation of 1 mole of liquid over the molar volume. The polymer solubility parameter can be measured indirectly from equilibrium-swelling measurements in solvents of differing solubility parameters as described in May, Epoxy Resins: Chemistry and Technology (1988) 604–605.

The preferred block copolymers useful in the present invention are ABA type block copolymers described in U.S. Pat. No. 4,663,413, the disclosure of which is hereby incorporated by reference, and have the following general formula (I).

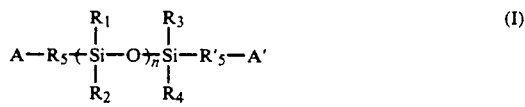

wherein n is an integer from 1 to about 200; $R_1$, $R_2$, $R_3$ and $R_4$ are independently linear or branched alkyl, alkenyl, haloalkyl, or haloalkenyl of 1 to 6 carbon atoms; aryl of 5 to 7 carbon atoms; aralkyl of 6 to 8 carbon atoms;

A and A' are independently

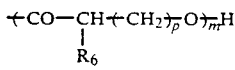

p is an integer from 0 to 6; m is an integer from 1 to about 250; $R_6$ is hydrogen or linear or branched alkyl of 1 to 6 carbon atoms;

$R'_5$ is $-R_7-O-$, $-R_7-NR_8-$,

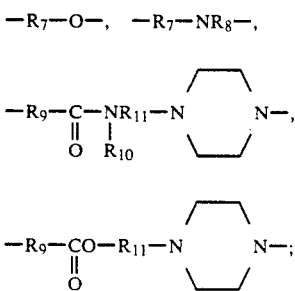

$R_5$ is $-O-R_7-$, $-NR_8-R_7-$;

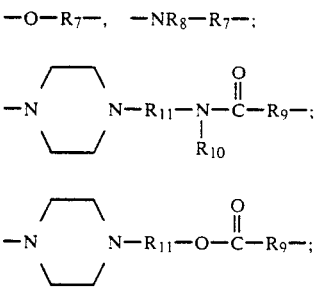

$R_7$, $R_9$ and $R_{11}$ are independently $-(CH_2)_q$, is an integer from 1 to 20;

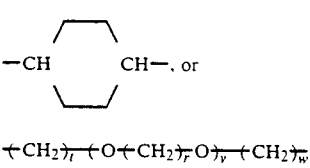

where r, t and w are independently integers from 1 to 6 and v is an integer from 1 to about 100; $R_8$ and $R_{10}$ are independently hydrogen or alkyl of 1 to 6 carbon atoms.

The preferred polysiloxane-polylactone copolymers useful in the invention are characterized as block copolymers. By the terms "block" is meant that there is at least one repeating monomeric unit in the copolymer which repeated on the order of about 10 to 200 times. In particular, this means that in the formula given above, either n, m or v must be of a magnitude sufficient to define a block.

Referring to the formula above, $R_1$, $R_2$, $R_3$ and $R_4$ are independently linear or branched alkyl, alkenyl, haloalkyl or haloalkenyl of 1 to 6 carbon atoms, aryl of 5 to 7 carbon atoms or aralkyl of 6 to 8 carbon atoms. Exemplary alkyl groups are methyl, ethyl, propyl, isopropyl, butyl, and the like. Examplary alkenyl groups are ethenyl, 1-prop-2-enyl, and the like. For the haloalkyl and haloalkenyl groups, the halo group is preferably fluoro. Illustrative haloalkyl groups are trifluoromethyl 1,1,2,2-tetrafluoroethyl, and the like. Representative haloalkenyl groups are 1,2-difluoroprop-1-enyl, and the like.

Illustrative aryl groups are phenyl and substituted-phenyl. Representative aralkyl groups are benzyl, 2-phenylethyl, and the like. Preferably $R_1$, $R_2$, $R_3$ and $R_4$ are alkyl of 1 to 6 carbon atoms. Most preferably, Rhd 1, $R_2$, $R_3$ and $R_4$ are methyl, The block copolymer will most preferably have number average molecular weights in the order of about 5,000 to about 25,000.

The moieties A and A' are derived from a lactone which is used as a starting material for forming the copolymers useful for the present invention. Thus, if an ε-caprolactone is used as a starting material, then p in the formulas A and A' will be 4 and $R_6$ will be hydrogen. This is the preferred moiety for A and A'. The groups $R_6$ may, however, be other linear or branched alkyl groups of 1 to 6 carbon atoms, such as methyl, ethyl, isopropyl, propyl and the like. The integer m may be of a magnitude which describes a block as described above, however, if there is at least one other block in the copolymer, then m may be a low as 1.

A preferred class of compounds are those in which $R_5$ and $R_5$, are the groups $-R_7-O-$. The group $R_7$ may be a linear alkylene group $-(CH_2)-_q$, where q is an integer from 1 to 20; or $R_7$ may be cycloalkylene-1,4-yl, or a linear polyalkylene ether of the formula $-(CH_2)_r-(-O-(CH_2)_t-O-)_v-(CH_2)_w-$. where r, t and w are independently integers from 1 to 6 and v is an integer from 1 to about 100. Preferably, $R_7$ is a linear alkylene group wherein 2 is an integer from 1 to 20. A second class of preferred $R_5$ and $R_5$, groups are $-R_7-NR_8-$. The group $R_7$ will be as defined above. The compounds where $R_7$ is a linear alkylene group wherein q is an integer from 1 to 20 is preferred. The substituent $R_8$ may be hydrogen or alkyl of 1 to 6 carbon atoms, such as methyl, ethyl, isopropyl, n-propyl, butyl, t-butyl and the like. Preferably, $R_8$ is hydrogen.

The groups $R_5$ and $R_5$, may also be

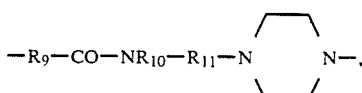

wherein $R_9$ and $R_{11}$ are defined as the same group of substituents for $R_7$ above. The group $R_{10}$ may be hydrogen or alkyl of 1 to 6 carbon atoms such as methyl, ethyl, isopropyl, n-propyl, t-butyl and the like. Preferably $R_{10}$ is hydrogen and $R_9$ and $R_{11}$ are independently linear alkylene groups wherein q is an integer from 1 to 20.

The epoxy resin composition will generally comprise an amount of polylactone-polysiloxane modifier within the range of about 1 to about 50, preferably about 5 to about 40, most preferably more than 10 to about 35 weight percent modifier based on the weight of the epoxy resin. These polymers are readily dispersible in epoxy resins and unexpectedly gave good physical properties to the molding powder compositions within the range of about 10 to about 30 weight percent based on the modified epoxy resin. The modifier imparts toughness and lower modulus to the epoxy resin composition without significantly affecting the $T_g$, which is important in encapsulation technology. Further, it provides compositions which have lower levels of ionic contaminants which are typically present in conventional commercial carboxy-terminated butadiene acrylonitrile modifiers. The polysiloxane-modified composition also provides improved toughness and better processability compared to conventional sticky compositions.

Generally, suitable epoxy resins include a broad range of liquid or solid resins characterized by the presence of, on average, at least one 1,2-epoxy group (i.e. vicinal epoxy group) per molecule. Examples of suitable epoxy resins include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, expoxidized polyolefins, epoxidized diunsaturated acid esters, epoxidized unsaturated polyesters, epoxy novolacs, and copolymers and mixtures thereof. The composition will generally comprise an amount of epoxy resin within the range of about 1 to about 60, preferably about 20 to about 40, weight percent epoxy resin based on the weight of the composition.

Suitable epoxy curing agents include anionic initiators, cationic initiators, carboxy functionalized polyesters, polyamides, amidoamines, polyamines, melamine-formaldehydes, phenol-formaldehydes, urea-formaldehydes, dicyandiamide, polyphenols, polysulfides, ketimines, novolacs, anhydrides, blocked isocyanates, anhydrides, and imidazoles. Preferably polyamines, novolacs, or anhydrides, most preferably novolacs such as an epoxidized ortho creosol novolac, are used as curing agents in encapsulation application. The composition will generally contain from about 1 to about 60, preferably about 30 to about 60, weight percent curing agent based on the epoxy resin composition. The polyactone-polysiloxane modifier can be added to the curing agent as long as the modifier can be added before curing.

The invention composition must also contain a filler. In compositions comprising only epoxy resin and the polysiloxane-polyactone modifier, increasing amounts of modifier will result in an increase in the coefficient of thermal expansion and a decrease in the modulus. By contrast, in compositions including a filler, the polysiloxane-polylactone modifier, and an epoxy resin, increasing amounts of modifier will result in the desired reduction of both the coefficient of thermal expansion and the modulus and thus lowering the internal stress of the composition. The composition must contain an amount of filler sufficient to produce this desired property of decreasing both the coefficient of thermal expansion and modulus with increasing amounts of modifier. The amount of filler is also a function of the application in which the composition is being used. In encapsulation applications, the composition will generally contain at least about 55 weight percent filler, preferably about 70 weight percent filler. Generally the compositions will not contain more than about 95 weight percent filler. The invention molding powder composition will generally comprise an amount of polyactone-polysiloxane modifier within the range of about 1 to about 40, preferably about 2 to about 30, most preferably about 2 to about 20, weight percent modifier based on the weight of the composition.

Suitable fillers are any filler which has low coefficient of thermal expansion such as metal oxide fillers and mineral fillers. They include, for example, silica, iron oxide, mica, alumina, talc, antimony trioxide, titanium oxide and the like, depending on the desired application. The coefficient of thermal expansion of the filler is preferably less than about $6 \times 10^{-6}$ ° $C.^{-1}$ to achieve the desired low stress. Preferably the composition comprises a mineral filler such as silica for VLSI encapsulation so the property of the encapsulate will be similar to the silicon-based substrate.

other thermosettable resins that may optionally be included in the composition include for example, polyurethane, polyureas, polyamides, brominated epoxies, phenoxy resins, polyesters, polyester-polyether copolymers, bismaleimides, polyimides, and mixtures and copolymers thereof.

The invention molding powder composition may include other additives, such as stabilizers, extenders, plasticizers, pigments, reinforcing agents, flow control agents and flame retardants.

Methods for formulating an encapsulation composition are well known. Generally the first step is to grind the ingredients, i.e., the resin, curing agent, polycaprolactone-polysiloxane, and any filler, typically with a grinder or hammer mill. The particles are then screened and dry blended. Next, the dry blended mixture is melt mixed, in a roll mill or extruder, at a temperature above the softening point of the mixture, generally about 15° C. to about 30° C. above the softening point of the mixture. In addition, the block copolymer may be introduced into the system by first dry blending or melt mixing the block copolymer with the curing agent, the resin or both.

The filler is preferably pretreated prior to blending in order to improve interfacial adhesion between epoxy matrix and filler. Preferably, the filler is coated with a coupling agent, such as silane coupling agents, which is sprayed on the surface of the filler and mixed in a mixer prior to blending in the molding powder formulation.

The curing agent may be melt mixed or dry blended with from about 1 to about 50, preferably about 5 to about 40 weight percent polysiloxane-polyactone block copolymer, based on the weight of the curing agent. Likewise, the epoxy resin may be melt mixed or dry blended with from about 1 to about 50, preferably about 5 to about 40, weight percent polysiloxane-polylactone block copolymer, based on the weight of the epoxy resin.

The melt blending can be accomplished using a twin screw extruder or a two or three roller heated roll mill at temperatures in the range of about 100° to 120° C. depending on the melt characteristics of the molding powder. The molding powders are typically milled and screened.

For ease of handling, preforms can be made by using any suitable method to produce a pellet, for example, by hydraulic pressing in a mold. Transfer molding it most commonly used for encapsulation. The desired article can be obtained by placing an electrical component in a cavity and casting preforms in a transfer molding machine under conditions that the preforms will gel and flow to fill the cavity, which is typically operated at a temperature of about 160° to about 180° C., a transfer pressure of about 500 to about 1000 psi, and mold clamp pressure of about 1000 to about 2000 psi. Optionally, the preforms can be heated in a radio frequency oven before being placed in the molding machine, which may be desirable if the preform size is large. The articles may be post cured at elevated temperatures to develop maximum physical properties.

The composition may find use in coating applications in which low stress properties are desired. For coating applications, the composition will generally contain at least about 40 weight percent filler to produce the desired property.

Specific embodiment of the curable epoxy resin compositions of the present invention are further described in detail in the following examples.

EXAMPLE 1

Run numbers 1–4 in Table 2 below describe polysiloxane-modified epoxy resin compositions at various block copolymer concentrations to demonstrate the superior toughness of the compositions. Run numbers 5–7 in Table 2 describe the polysiloxane-modified low stress epoxy resin invention compositions.

The neat casting of run 1 was made by melting 74.80 grams of phenolic novolac curing agent in a 800 ml glass beaker in a 150° C. formed air oven, adding and mixing 0.3 gram of triphenylphosphine (TPP) catalyst and then adding 120 grams of 3,3′5,5′-tetramethylbiphenyl(4,4′-diglycidyl ether). After mixing, the mixture was placed in a 150° C. vacuum oven. The mixture was poured in oven between glass plates coated with a thin layer of SurfaSil (silicone mold release agent manufactured by Pierce Chemical Co.), separated with ⅛ inch diameter Teflon ® rope as a spacer and held by binder clips. The casting was cured for 2 hours at 150° C. followed by 4 hours at 200° C. The casting was removed from the oven, cooled to room temperature, and removed from the glass mold.

For run number 2, 141.45 grams of the diglycidyl ether of 4,4′-tetramethylbiphenol and 7.44 grams of SMA-423 supplied by Goldschmit Chemical (linear polycaprolactone-polysiloxane-polycaprolactone block copolymer having a number average molecular weight of each block of approximately 2000, 3000 and 2000, respectively) were placed in a 1 liter rotary evaporating flask. Both components were purified prior to use by heating at 150° C. in a rotary evaporator under vacuum. The mixture was heated in an oil bath at 150° C. under vacuum for approximately 1½ hours. The mixture was decanted in a forced air oven operating at 150° C. and cooled to room temperature under nitrogen atmosphere. Subsequently, the casting was made in a similar manner to run 1, except 70.98 grams of phenolic novolac curing agent was used and 120 grams of the biphenyl/SMA blend instead of the diglycidyl ether of tetramethylbiphenol was used.

For run number 3, 154.98 grams of diglycidyl ether of tetramethylbiphenol and 17.22 grams of SMA-423 were placed in a 1 liter rotary evaporating flask. The mixing conditions were similar to run number 2, except the mixture was allowed to blend for approximately 2½ hours. The casting was made in a similar manner to run 2, except 67.19 grams of phenolic novolac curing agent was used.

For run number 4, 145.40 grams of the diglydidyl ether of tetramethylbiphenol and 25.66 grams of SMA-423 were placed in a 1 liter rotary evaporating flask. The mixing conditions were similar to run number 3. The casting was made in a similar manner to run 2, except 63.78 grams of phenolic novolac curing agent was used.

The properties of the polysiloxane-modified epoxy resin castings of runs 1–4 are shown in Table 2. The glass transition temperature ($T_g$) of runs 1–4 in Table 2 are low possibly due to the use of old phenolic curing agents, which may contained a significant amount of moisture. But for comparison purpose, this should not affect the trend in the $T_g$.

The resin/SMA-423 mixtures used in runs 5–7 were obtained in a similar manner to run 2, except the following amounts of components were used.

| Run No. | Diglycidyl ether of tetramethylbiphenyl (grams) | SMA-423 (grams) |
|---|---|---|
| 5 | 150 | 0 |
| 6 | 142.5 | 7.5 |
| 7 | 127.5 | 22.5 |

The resin/SMA-423 products were milled in a hammer mill and passed through a 35 mesh sieve. Brominated epoxy novolac and phenolic novolac curing agent (obtained from Borden Chemical Co.) were purified prior to use by heating at 150° C. in a rotary evaporator under vacuum, milled in a hammer mill and passed through a 35 mesh sieve. Carnuba Wax and triphenylphosphine (TPP) were pulverized and passes through a 35 mesh sieve. 2.016 grams of (3-glycidoxypropyl)trimethoxysilane coupling agent (obtained from Petrach Systems) was sprayed on the surface of 840 grams of fuses silica by an atomizer type sprayer at low pressure, and mixed in a Turbula mixer.

Table 1 below described the molding powder formulations. The ingredients listed in Table 1, except treated silica, were first mixed in a Turbula mixer for about one hour. Treated silica was then added and mixed for an additional one hour. The resulting powder formulations were melt blended in a twin screw extruder at temperature of about 105° C. The material was cooled to room temperature, milled in a Waring blender, and passed through a 16 mesh sieve. These powders were stored at 4° C. under nitrogen purge.

TABLE 1

| | (grams) | | |
|---|---|---|---|
| Run # | 5 | 6 | 7 |
| Resin/SMA-423 | 75 | 80 | 90 |
| Brominated epoxy novolac | 7.50 | 8.00 | 9.00 |
| phenolic novolac | 50.48 | 51.08 | 51.75 |
| Antimony oxide | 7.50 | 8.00 | 9.00 |
| Carnuba wax | 1.50 | 1.60 | 1.80 |
| Triphenylphosphine | 2.25 | 2.40 | 2.70 |
| Fused Silica (treated) | 336.54 | 352.53 | 383.24 |

Preforms were made using a Hull transfer molding press operated at room temperature at 4000 psi on the plunger with pressure held for 45 seconds. The preforms were heated in a radio frequency oven at 90° C. Pieces were cast in a two piece metal book mold, 1″×3″×⅛″ thick, in a Hull transfer molding press at 175° C. operated at 1000 psi pressure with a molding time of 3.5 minutes. They were released from the mold, cooled in room temperature and postcured in a forced draft oven clamped between clean plate glass for 4 hours.

The properties of these polysiloxane-modified molding compositions are shown in Table 2.

TABLE 2

| Run # | 1 | 2 | 3 | 4 | 5 | 6 | 7 |
|---|---|---|---|---|---|---|---|
| % SMA in Epoxy | 0 | 5 | 10 | 15 | 0 | 5 | 15 |
| % Silica in Formulation | — | — | — | — | 70 | 70 | 70 |
| Tg, °C., Tan Delta | 123 | 123 | 123 | 123 | 174 | 174 | 170 |
| Tg, °C., TMA | 109 | 107 | 103 | 110 | 149 | 151 | 151 |

TABLE 2-continued

| Run # | 1 | 2 | 3 | 4 | 5 | 6 | 7 |
|---|---|---|---|---|---|---|---|
| CTE, ppm/°C.[1] | | | | | | | |
| 50–100° C. Range | 68 | 68 | 79 | 90 | 24.8 | 22.7 | 19.7 |
| 220–240° C. Range | 203 | 207 | 209 | 208 | 86.1 | 85.0 | 84.2 |
| Flex Properties | | | | | | | |
| Strength, ksi | 20.7 | 19.1 | 17.9 | 16.8 | 18.7 | 18.2 | 19.0 |
| Modulus, ksi | 533 | 508 | 478 | 475 | 2033 | 1815 | 1679 |
| % Elongation | 6.0 | 5.8 | 5.8 | 5.7 | 1.0 | 1.09 | 1.42 |
| Water Absorption[2] | 2.41 | 2.35 | 2.25 | 2.12 | 0.6 | 0.6 | 0.6 |
| Dielectric Constant, 1 MHz | 3.74 | 3.68 | 3.68 | 3.66 | — | — | — |
| Dissipation Factor, 1 MHz | .021 | .020 | .020 | .020 | — | — | — |
| Fracture Tough, psi * in ½ | 679 | 1598 | 2056 | 2142 | — | — | — |
| CTE * Modulus, psi/°C. | 36.4 | 34.8 | 37.7 | 42.8 | 50.42 | 41.2 | 33.1 |
| % Internal Stress Reduction | — | — | — | — | — | 18 | 34 |

[1] Coefficient of thermal expansion.
[2] % Weight gain, immersed in water for 2 weeks at 93° C.

As can be seen from Table 2, the polysiloxane-modified epoxy resin compositions have excellent fracture toughness above about 10% SMA without significant decrease in $T_g$. From Table 2, a decrease in both coefficient of thermal expansion and modulus can be observed in runs 6 and 7, indicating the low internal stress value for these polysiloxane-modified molding powder formulations.

EXAMPLE 2

Run numbers 1–4 and 9–12 in Table 3 below describe carboxy-terminated butadiene acrylonitrile (CTBN)-modified epoxy resin compositions at similar block copolymer concentrations as in Example 1. Run numbers 5∝8 in Table 4 describe powder molding compositions modified by CTBN and silica. Run numbers 1–4 were melt blended and run numbers 5–12 were formed by adduct formation of CTBN and the resin.

Runs numbers 1–4 were prepared in a similar manner to example 1, except CTBN (Hycar ® 1300X8 available from B. F. Goodrich Co.) was used in place of SMA-423 as listed below.

| Run No. | Diglycidyl ether of tetramethylbiphenyl (grams) | CTBN (grams) |
|---|---|---|
| 1 | 100.0 | 0.0 |
| 2 | 302.00 | 15.90 |
| 3 | 278.28 | 30.92 |
| 4 | 259.53 | 45.80 |

Run numbers 5–8 were prepared by adduct formation between the resin and CTBN. The ingredients listed below were placed in a 1 quart metallic container and mixed after 45 minutes in a 150° C. forced air oven. TPPEI (triphenylphosphine ethyl imidazole) was subsequently added and allowed to react for 1.5 hours while stirring every 30 minutes. After 1.5 hours, the product was cooled by removing the container from the oven.

| Run No. | Diglycidyl ether of tetramethylbiphenyl (grams) | CTBN (grams) | TPPEI |
|---|---|---|---|
| 5 | 100.0 | 0.0 | |
| 6 | 95.0 | 5.0 | 0.095 |
| 7 | 90.9 | 10.1 | 0.0908 |
| 8 | 90.57 | 16.0 | 0.0907 |

These CTBN-containing epoxy resins of runs 2–4 and 8 were too sticky to grind into powders. Neat casting of run 5–8 were prepared in a similar manner to Example 1, except CTBN-containing epoxy resins were used instead of the SMA-containing resins.

Molding powder run numbers 9–11 were prepared in a similar manner to Example 1, except CTBN/epoxy powders formed in a similar manner to runs 5–8 above were used instead of SMA/epoxy powders.

| Run No. | Diglycidyl ether of tetramethylbiphenyl (grams) | CTBN (grams) | TPPEI |
|---|---|---|---|
| 9 | 100.0 | 0.0 | |
| 10 | 137.18 | 7.22 | 0:1372 |
| 11 | 118.8 | 13.20 | 0.1188 |
| 12 | 113.33 | 20.00 | 0.1133 |

The ingredients listed in Table 3 were blended in a similar manner to Example 1, except CTBN-modified epoxy resin was used.

In run number 12, the 15% CTBN-containing epoxy blend molding powder was too sticky to grind into a powder, therefore, the sample was melt blended by melting 12.5 grams of brominated epoxy novolac and 69.54 grams of phenolic novolac curing agent in a forced draft over separately and mixing in a container placed in a dry ice bath to rapidly cool them to prevent advancement of the resin. The mixture was milled in a hammer mill, and passed through a 35 mesh sieve. 95.23 grams of this powder (marked * in Table 3), 5.75 grams of antimony oxide, 1.15 grams of carnuba wax and 1.73 grams of triphenylphosphine were mixed for one hour on a Turbula mixer. Then treated fused silica (see example 1 for treatment) was added to the formulation and mixed for another hour on the Turbula mixer. The mixture was then melt blended, preformed and molded under same procedures as Example 1.

TABLE 3

| Run # | (grams) | | | |
|---|---|---|---|---|
| | 9 | 10 | 11 | 12 |
| Resin/CTBN | 75.00 | 75.00 | 61.62 | 95.23* |
| Brominated epoxy novolac | 7.50 | 7.50 | 6.16 | |
| Phenolic novolac | 50.48 | 47.59 | 36.36 | |
| Antimony oxide | 7.50 | 7.50 | 6.16 | 5.75 |
| Carnuba wax | 1.50 | 1.50 | 1.23 | 1.15 |
| Triphenylphosphine | 2.25 | 2.25 | 1.85 | 1.73 |
| Fused Silica (treated) | 336.54 | 329.8 | 264.35 | 242.32 |

Attempts were made to prepare acceptable CTBN-modified epoxy resin molding powders from the melt blended samples from CTBN-modified epoxy resins obtained in runs 5–8. But, these attempts were not very successful due to its difficulties in handling and unevenness in the melt blended products.

The properties of these CTBN-modified compositions are shown in Table 4 and 4A.

TABLE 4

| Run # | 1 | 2 | 3 | 4 |
|---|---|---|---|---|
| % CTBN | 0 | 5 | 10 | 15 |
| Tg, °C., Tan Delta | 143 | 143 | 143 | 143 |
| Tg, °C., TMA | 124 | 116 | 116 | 113 |
| CTE, ppm/°C. | | | | |
| 50–100° C. Range | 67 | 70 | 76 | 79 |
| 220–240° C. Range | 209 | 199 | 202 | 202 |
| Flex Properties | | | | |
| Strength, ksi | 18.8 | 17.3 | 16.0 | 14.6 |
| Modulus, ksi | 474 | 446 | 420 | 382 |
| % Elongation | 6.9 | 6.5 | 6.2 | 6.2 |
| Water Absorption | 1.91 | 1.95 | 1.91 | 1.92 |
| Dielectric Constant, 1 MHz | 3.65 | 3.68 | 3.78 | 3.84 |
| Dissipation Factor, 1 MHz | .020 | .025 | .030 | .035 |
| Fracture Tough, psi * in ½ | 838 | 1434 | 1581 | 1661 |
| CTE * Modulus, psi | 31.6 | 31.4 | 31.7 | 31.4 |
| % Internal Stress Reduction | — | — | — | — |

TABLE 4A

| Run # | 5 | 6 | 7 | 8 | 9 | 10 | 11 | 12 |
|---|---|---|---|---|---|---|---|---|
| % CTBN in Epoxy | 0 | 5 | 10 | 15 | 0 | 5 | 10 | 15 |
| % Silica in Formulation | — | — | — | — | 70 | 70 | 70 | 70 |
| Tg, °C., Tan Delta | 143 | 143 | 143 | 143 | 174 | 174 | 174 | 170 |
| Tg, °C., TMA | 124 | 120 | 118 | 115 | 149 | 140 | 143 | 146 |
| CTE, ppm/°C. | | | | | | | | |
| 50–100° C. Range | 67 | 69 | 76 | 82 | 24.8 | 23.1 | 20.8 | 20.5 |
| 220–240° C. Range | 209 | 202 | 197 | 202 | 86.1 | 83.2 | 64.3 | 69.8 |
| Flex Properties | | | | | | | | |
| Strength, ksi | 18.8 | 17.6 | 16.6 | 14.9 | 18.7 | 17.5 | 16.9 | 16.8 |
| Modulus, ksi | 474 | 458 | 433 | 390 | 2033 | 1959 | 1873 | 1774 |
| % Elongation | 6.9 | 6.3 | 6.4 | 6.3 | 1.0 | .95 | 1.07 | 1.01 |
| Water Absorption | 1.91 | 1.97 | 2.0 | 1.92 | 0.58 | 0.59 | 0.58 | 0.62 |
| Dielectric Constant, 1 MHz | 3.65 | 3.66 | 3.80 | 3.85 | — | — | — | — |
| Dissipation Factor, 1 MHz | .020 | .025 | .030 | .040 | — | — | — | — |
| Fracture Tough, psi * in ½ | 838 | 1457 | 1710 | 1722 | — | — | — | — |
| CTE * Modulus, psi/°C. | 31.6 | 31.3 | 33.0 | 32.0 | 50.42 | 45.3 | 38.9 | 36.4 |
| % Internal Stress Reduction | — | — | — | — | — | 10 | 23 | 28 |

As can be seen from Table 2 and Table 4A, the decrease in Tg of the polysiloxane-modified epoxy resin compositions in slightly less than that for the CTBN-modified epoxy resin compositions. The polysiloxane-modified formations exhibit a higher percent internal stress reduction than the CTBN-modified formations. In addition, the CTBN-modified epoxy resin compositions were sticky and difficult to handle. The SMA-modified epoxy resin compositions have better processability due to their lack of stickiness and improved flow properties.

The polysiloxane-modified epoxy resin compositions have improved fracture toughness compared with the CTBN-modified epoxy resin above 10 weight percent. The improvement is significant above about 15 percent modifier as evidenced by the significant increase in fracture toughness at 2142 psi* in ½ in run 4 Table 2 compared to run 4 in Table 4 at 1661 or run 8 in Table 4A at 1722 psi* in ½. This suggests that the molding powder formulations will also exhibit improved toughness at these percent modification levels.

Fraction change in length during the first thermal mechanical analysis (TMA) for 15% CTBN containing molding powders and 15% SMA-423 containing molding powders were measured between 50° to 200° C. For run number 5 in example 1 (no modifier), the fraction change in length was 72 μm/m. Surprisingly, for run number 7 in example 1 (15% SMA-423), the change was 57 μm/m, which is less than the non-modified powder, compared to run number 12 in example 2 (15% CTBN adduct) at 82 μm/m, which is greater than the non-modified powder. The low fraction change value of the SMA-423 modified molding powder suggests less expansion of the molded powders at higher temperature and results in retention of the original size of the shaped object during varying temperatures suggesting less mold-in-stress.

EXAMPLE 3

1,1',5,5'-tetrakis(4-glycidyloxyphenyl)pentane (GDA-E) and SMA-423 as listed in Table 5, were placed in a 2 liter evaporating flask. The flask was placed on a rotary evaporator, equipped with a condenser and heated oil bath at 150° C. After the contents of the flask melted, the mixture was allowed to blend for approximately one hour under vacuum. The produce was decanted into a metal pan in a 150° C. forced air oven, then allowed to cool to room temperature by removing the pan from the oven. The resulting solid was ground to a powder form.

100 parts of the powder, 10 parts of brominated epoxy resin, 50 parts of Durite® SD-1731 (a phenolic novolac available from Borden Chemical Co.) were melted in a rotary evaporator under vacuum to remove volatile components until completion. After cooling, the resulting solids were milled in a hammer mill to a particle size of less than 35 mesh size. The solids, 70 percent treated fused silica (see Example 1 for treatment) based on total mixture, 1.0 phr based on epoxy of triphenylphosphine accelerator, 2 Carnuba Wax and Siloxane coupling agent were place in a rotary type dry blender and blended for one hour. The mixture was next melt blended in a twin screw extruder at about 100° to 120° C. The resultant product was cooled and milled in a rotary blade type mill and passed through a 35 mesh sieve. Preform was made from the resulting powder using a hydraulic press. The preforms were placed in a hydraulic resin transfer molding machine operated at a temperature of 175° C., a transfer pressure of 500 to 1000 psi, and a molding clamp pressure of 2000 psi for 4 minutes. These pieces were post-cured in a force air oven for about four hours at 175° C. The properties of the molded test pieces are listed in Table 5 below.

TABLE 5

| Percent SMA 423 in Epoxy | 0% | 5% | 10% | 15% |
|---|---|---|---|---|
| GDA-E (grams) | 75 | 75 | 75 | 75 |
| SMA-423 (grams) | — | 3.95 | 8.33 | 13.24 |
| Tg, °C., Rheometrics | 213 | 213 | 213 | 213 |
| Tg, °C., TMA | 161 | 182 | 180 | 174 |
| CTE | | | | |
| 50–100° C.[1] | 27 | 28 | 26 | 24 |
| 220–240° C. | 74 | 93 | 86 | 83 |
| Flex Properties, 25° C. | | | | |
| Strength, ksi | 20 | 18 | 17 | 15 |
| Modulus, ksi | 2207 | 2022 | 1946 | 1725 |
| % Elongation | 1.0 | 1.0 | 1.1 | 1.1 |
| Water Absorption[2] | 0.7 | 0.7 | 0.7 | 0.7 |
| CTE * Modulus, psi/°C. | 59.6 | 56.6 | 50.6 | 41.4 |
| % Reduction of CTE * Modulus | | .5 | 15 | 31 |

[1]Coefficient of thermal expansion ($\times 10^{-6}$ m/m/°C.).
[2]% Weight gain, immersed in water for 2 weeks at 93° C.

As can be seen from Table 5, the formulations containing at least about 10% SMA-423 are particularly suitable for molding powder formulations as shown by the significant reduction in the internal stress expressed by decrease in % reduction of CTE multiplied by modulus. $T_g$ remained substantially the same for all of the above formulations.

EXAMPLE 4

Compositions containing EOCN 1027 (epoxidized orthocresol novolac available from Nippon Kagaku KK) and SMA-423 as listed in Table 6 were placed in a 2 liter evaporating flask. The flask was placed on a rotary evaporator, equipped with a condenser and heated oil bath at 150° C. After the contents of the flask melted, the mixture was allowed to blend for approximately one hour under vacuum. The product was decanted into a metal pan in a 150° C. forced air oven, then allowed to cool to room temperature by removing the pan from the oven. The resulting solid was ground to a powder form.

The molding powder formulations and test pieces were prepared as described in Example 3, except modified EOCN 1027 powder described above was used instead of modified GDA-E. The properties are listed in Table 6 below.

TABLE 6

| Percent of SMA 423 in Epoxy | 0% | 5% | 10% | 15% |
|---|---|---|---|---|
| EOCN 1027 (grams) | 60 | 57 | 54 | 51 |
| SMA-423 (grams) | — | 3 | 6 | 9 |
| Tg, °C., Rheometrics | 216 | 216 | 216 | 216 |
| Tg, °C., TMA | 173 | 175 | 175 | 177 |
| CTE | | | | |
| 50–100° C.[1] | 24 | 23 | 22 | 20 |
| 220–240° C. | 80 | 82 | 81 | 82 |
| Flex Properties, 25° C. | | | | |
| Strength, ksi | 20 | 21 | 20 | 19 |
| Modulus, ksi | 2349 | 2170 | 2121 | 2031 |
| % Elongation | 0.9 | 1.0 | 1.1 | 1.1 |
| Water Absorption[2] | 0.7 | 0.7 | 0.7 | 0.7 |
| Dielectric Constant, 1 MHz | 3.8 | 3.8 | 3.9 | 3.8 |
| Dissipation Factor, 1 MHz | .008 | .009 | .008 | .008 |
| CTE * Modulus, psi/°C. | 56.38 | 49.91 | 46.60 | 40.60 |
| % Reduction of CTE * Modulus | | 11 | 17 | 28 |

[1]$\times 10^{-6}$ m/m°C.
[2]% Weight gain, immersed in water for 2 weeks at 93° C.

As can be seen from Table 6, the formulations containing from about 10% SMA-423 are particularly suitable for molding powder formulations, as suggested by the significant reduction in the internal stress expressed as decrease in % reduction of CTE multiplied by modulus. The $T_g$ was substantially constant for all of these formulations.

EXAMPLE 5

The neat resin properties of various epoxy resins modified by various number average molecular weight SMA block copolymers are described in Table 7 below. The neat resins were made in a similar manner to example 1, except EPON® Resin 828 (glycidyl ether of bisphenol-A available from Shell Chemical Co.) were used in place of diglycidyl ether of tetramethylbiphenol (TMB) in runs 1, 2 and 3 as listed in Table 7. In runs 3 and 6, SMA-446 (linear polycaprolactone-polysiloxane-polycaprolactone block copolymer having number average molecular weight of each block of approximately 4000/6000/4000 supplied by Goldschmidt Chemical) was used in place of SMA-423 as listed in Table 7.

The properties of these polysiloxane-modified epoxy resin castings are shown in Table 7. As can be seen from Table 7, both SMA block copolymers decrease modulus compared to unmodified resin castings without a significant decrease in $T_g$, suggesting that these epoxy resins and SMAs are suitable for use in low-stress encapsulation formulations when blended with a filler as in Example 1.

TABLE 7

| Run # | 1 | 2 | 3 | 4 | 5 | 6 |
|---|---|---|---|---|---|---|
| EPON ® Resin 828 | 100 | 100 | 100 | | | |
| TMB | | | | 100 | 100 | 100 |
| SMA 423 | | 5 | | | 5 | |
| SMA 446 | | | 5 | | | 5 |
| Tg, °C., tan Delta | 130 | 130 | 130 | 160 | 150 | 150 |
| Tg, °C., TMA | 120 | 118 | 117 | 145 | 141 | 141 |

TABLE 7-continued

| Run # | 1 | 2 | 3 | 4 | 5 | 6 |
|---|---|---|---|---|---|---|
| CTE | | | | | | |
| <Tg | 69 | 74 | 76 | 67 | 67 | 66 |
| >Tg | 189 | 192 | 194 | 180 | 186 | 188 |
| Dielectric Constant, 1 MHz | 3.75 | 3.75 | 3.73 | 3.58 | 3.60 | 3.55 |
| Dissipation Factor, 1 MHz | 0.026 | 0.026 | 0.026 | 0.022 | 0.022 | 0.022 |
| Flex Properties, Dry | | | | | | |
| Strength, ksi | 18 | 16 | 16 | 15 | 15 | 15 |
| Modulus, ksi | 428 | 403 | 408 | 391 | 385 | 378 |
| % Elongation | 7.2 | 6.5 | 6.6 | 7.3 | 6.9 | 7.0 |
| Flex Properties, Wet | | | | | | |
| Strength, ksi | 0.9 | 0.7 | 0.6 | 8.2 | 7.4 | 7.2 |
| Modulus, ksi | 50 | 73 | 79 | 293 | 279 | 263 |
| % Elongation (No Break) | 4.72 | 7.22 | 6.53 | 3.75 | 3.77 | 3.79 |
| % Moisture Gain[1] | 2.3 | 2.3 | 2.3 | 1.7 | 1.7 | 1.7 |
| Fracture Toughness, Kq | 629 | 1662 | 1590 | 1366 | 1458 | 1352 |
| Fracture Energy, Gic, in-lb/in$^2$ | | | | | | |

[1]Weight gain, immersed in water for 2 weeks at 93° C.

EXAMPLE 6

The neat resin properties of EPON® HPT Resin 1071 (tetraglycidyl diamine resin available from Shell Chemical Co.) and EPON® HPT Resin 1079 (diglycidyl ether of bisphenol fluorenone available from Shell Chemical Co.) modified by SMA-423 block copolymer are described in Table 8 below.

In run number 1, 100 g of EPON® HPT Resin 1071 was melted in a 150° C. circulating air oven, 61.0 g of EPON® HPT Curing Agent 1062 was melted at 170° C. in a circulating air oven and added to the EPON® HPT Resin 1071 while hand mixing. It was then degassed in a 160°-170° C. vacuum oven, poured into a preheated (150° C.) glass mold and cured for 2 hours at 150° C. then 4 hours at 200° C.

In run number 2, 110 g of EPON® HPT Resin 1071 and 11.0 g of SMA-423 were charged into a 500 ml rotary evaporating flask and placed under vacuum at 155° C. When the foaming stopped, 0.1% (0.12 g) of triphenylphosphine was added and held at 155° C. for 1½ hours under vacuum. 110 g of the EPON® HPT Resin 1071/SMA-423 mixture was heated to 150° C. in a circulating air oven. 61.0 g of EPON® Curing Agent 1062 was melting in a 170° C. circulating air oven and added to the mixture while mixing. It was then degassed in a 160°-170° C. vacuum oven, poured into a preheated (150° C.) glass mold and cured for 2 hours at 150° C. then 4 hours at 200° C.

In run number 3, 100 g of EPON® HPT Resin 1079 was melted at 150° C. in a circulating air oven. 52.0 g of EPON® HPT Curing Agent 1062 was melted at 170° C. in a circulating air oven and added to the EPON® HPT Resin 1079 while hand mixing. It was then degassed in a 160°-170° C. vacuum oven, poured into a preheated (150° C.) glass mold and cured for 2 hours at 150° C. then 4 hours at 200° C.

In run number 4, 110 g of EPON® 1079 and 11.0 g of SMA-423 was charged into a 500 ml rotary evaporating flask and placed under vacuum at 155° C. When the foaming stopped, 0.1% (0.12 g) of triphenylphosphine was added and held at 155° C. for 1½ hours under vacuum. 110 g of the EPON® HPT Resin 1079/SMA-423 mixture was heated to 150° C. in a circulating air oven. 52.0 g of EPON® Curing Agent 1062 was melting in a circulating air oven at 170° C. and added to the mixture while mixing. It was degassed in a 160°-170° C. vacuum oven under vacuum, poured into a preheated (150° C.) glass mold and cured for 2 hours at 150° C. then 4 hours at 200° C. in a circulating air oven.

The properties of these polysiloxane modified resin compositions are shown in Table 8. As can be seen in Table 8, the polysiloxane-modified epoxy resin compositions have improved fracture toughness compared with unmodified compositions. It suggests the compositions to be suitable for use as low stress epoxy molding powder formations when blended with a filler as in Example 1, shown by the decrease in modulus without sacrificing $T_g$.

TABLE 8

| Run # | 1 | 2 | 3 | 4 |
|---|---|---|---|---|
| EPON® Resin HPT 1071 (grams) | 100 | 110 | | |
| EPON® Resin HPT 1079 (grams) | | | 100 | 110 |
| SMA 423 (grams) | | 11.0 | | 11.0 |
| Tg, °C., tan Delta | 231 | 231 | 208 | 209 |
| Flex Properties, Dry | | | | |
| Strength, ksi | 17 | 15.2 | 17.9 | 16.0 |
| Modulus, ksi | 498 | 435 | 467 | 424 |
| % Elongation | 3.8 | 4.0 | 7.8 | 4.7 |
| % Moisture Gain[1] | 1.6 | 1.5 | 1.3 | 1.3 |
| Fracture Toughness, Kq | 517 | 897 | 529 | 952 |
| Fracture Energy, Gic, in-lb/in$^2$ | 1.6 | 1.5 | 0.60 | 2.14 |

[1]Weight gain, immersed in water for 2 weeks at 93° C.

We claim:

1. A solventless composition comprising: (a) a curable epoxy resin; (b) a curing agent for the epoxy resin; (c) a linear polycaprolactone-polysiloxane AB or ABA block copolymer wherein B is a polysiloxane segment and A is a polylactone segment; and (d) at least about 55 weight percent, based on the weight of the composition, of a filler having a coefficient of thermal expansion of less than about $6 \times 10^{-6}$ C.$^{-1}$.

2. The composition of claim 1 in which the block copolymer is present in an amount within the range of about 5 to about 40 weight percent based on the curable epoxy resin.

3. The composition of claim 2 in which the curable epoxy resin is present in an amount within the range of about 1 to about 60 weight percent, and the curing agent is present in an amount within the range of about 1 to about 60 weight percent based on the weight of (a), (b) and (c).

4. The composition of claim 3 in which the curing agent is selected from the group consisting of anionic initiators, cationic initiators, carboxy functionalized polyesters, polyamides, amidoamines, polyamines, melamine-formaldehydes, phenol-formaldehydes, urea-formaldehydes, dicyandiamide, polyphenols, polysulfides, ketimines, novolacs, blocked isocyanates, and imidazoles.

5. The composition of claim 3 in which component (c) is a linear block copolymer ABA comprising an organosiloxane block B and polylacetone block A in which the number average molecular weight ratio of total A to B is greater than or equal to one.

6. A composition comprising: (a) a curable epoxy resin; (b) a curing agent for the epoxy resin; (c) a linear polysiloxane-polylactone block copolymer having the formula:

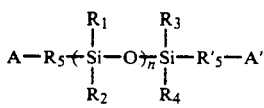

where n is an integer from 1 to about 200; $R_1$, $R_2$, $R_3$ and $R_4$ are independently selected from linear and branched alkyl, alkenyl, haloalkyl, and haloalkenyl of 1 to 6 carbon atoms, aryl of 5 to 7 carbon atoms, aralkyl of 6 to 8 carbon atoms;

A and A' are independently

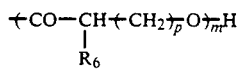

in which p is an integer from 0 to 6; m is an integer from 1 to about 250; $R_6$ is hydrogen or linear or branched alkyl of 1 to 6 carbon atoms;

$R'_5$ is

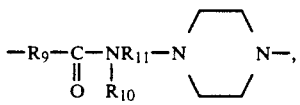

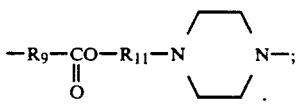

$R_5$ is

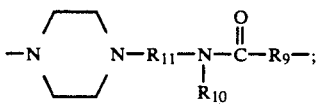

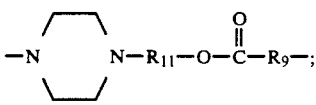

$R_7$, $R_9$ and $R_{11}$ are independently $-(CH_2)_q-$, in which q is an integer from 1 to 20;

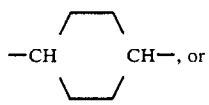

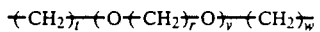

where r, t and w are independently integers from 1 to 6 and v is an integer from 1 to about 100; $R_8$ and $R_{10}$ are independently hydrogen or alkyl of 1 to 6 carbon atoms; and (d) at least about 40 weight percent, based on the weight of the composition, of a filler.

7. The composition of claim 6 wherein
$R_5'$ is $-R_7-O-$;
$R_5$ is $-O-R_7-$; and
$R_7$ is a linear alkylene group $-(CH_2)-_q$.

8. The composition of claim 7 wherein $R_6$ is hydrogen and p is 4.

9. The composition of claim 6 wherein $R_5'$ is $-R_7-NR_8-$; $R_5$ is $-NR_8-R_7-$; and $R_7$ is a linear alkylene group $-(CH_2)-_q$.

10. The composition of claim 9 wherein $R_6$ and $R_8$ are hydrogen and p is 4.

11. A molding powder formulation comprising the composition of claim 1.

12. A molding powder formulation comprising the composition of claim 2.

13. A molding powder formulation comprising the composition of claim 3.

14. A molding powder formulation comprising the composition of claim 5.

15. A molding powder formulation comprising the composition of claim 6.

16. An article comprising the cured molding powder formulation of claim 11.

17. An article comprising the cured molding powder formulation of claim 12.

18. An article comprising the cured molding powder formulation of claim 13.

19. An article comprising the cured molding powder formulation of claim 14.

20. An article comprising the cured molding powder formulation of claim 15.

21. A process for preparing a low-stress encapsulation formulation comprising an solventless intimate mixture of an epoxy resin and a curing agent for the epoxy resin, the process comprising incorporating in said mixture (a) a mineral filler having a coefficient of thermal expansion of less than about $6 \times 10^{-6}$° C.$^{-1}$ and (b) an AB or ABA type block copolymer wherein B is a polysiloxane segment greater than about 10 units having a solubility parameter of about 7 to about 8, A is a polylactone segment having a solubility parameter of about 9 to about 10, and the number average molecular weight ratio of total A to B is greater than or equal to 1, so as to form an encapsulation formulation comprising at least about 55 weight percent of the filler and at least about 2 weight percent of the block copolymer.

22. The process of claim 21 wherein the block copolymer is a polycaprolactone-polysiloxane block copolymer.

23. The process of claim 22 wherein the polycaprolactone-polysiloxane block copolymer is an ABA type block copolymer.

24. The process of claim 23 wherein the filler is silica.

25. The process of claim 23 wherein the filler is pretreated with a coupling agent.

26. The process of claim 23 wherein the curing agent is selected from the group consisting of anionic initiators, cationic initiators, carboxy functionalized polyesters, polyamides, amidoamines, polyamines, melamine-formaldehydes, phenol-formaldehydes, urea-formaldehydes, dicyandiamide, polyphenols, polysulfides, ketimines, novolacs, anhydrides, blocked isocyanates, and imidazoles.

27. The process of claim 23 wherein the ABA block copolymer is a linear polysiloxane-polycaprolactone block copolymer having the formula:

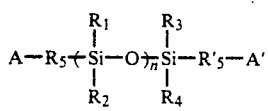
(I)

where n is an integer from 1 to about 200; $R_1$, $R_2$, $R_3$ and $R_4$ are independently linear or branched alkyl, alkenyl, haloalkyl, or haloalkenyl of 1 to 6 carbon atoms; aryl of 5 to 7 carbon atoms; aralkyl of 6 to 8 carbon atoms;

A and A' are independently

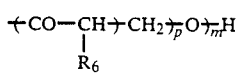

in which p is an integer from 0 to 6; m is an integer from 1 to about 250; $R_6$ is hydrogen or linear or branched alkyl of 1 to 6 carbon atoms;

$R'_5$ is

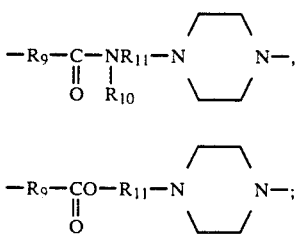

$R_5$ is

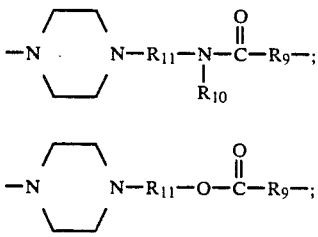

$R_7$, $R_9$ and $R_{11}$ are independently $(CH_2)_q$, in which q is an integer from 1 to 20;

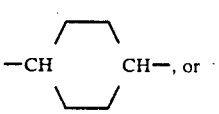

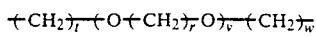

where r, t and w are independently integers from 1 to 6 and v is an integer from 1 to about 100; $R_8$ and $R_{10}$ are independently hydrogen or alkyl of 1 to 6 carbon atoms.

28. The process of claim 27 wherein $R_1$, $R_2$, $R_3$ and $R_4$ are independently linear or branched alkyl of 1 to 3 carbon atoms.

29. The process of claim 27 wherein
$R_5'$ is $-R_7-O-$;
$R_5$ is $-O-R_7-$; and
$R_7$ is a linear alkylene group $-(CH_2)-_q$.

30. The process of claim 29 wherein $R_6$ is hydrogen and p is 4.

31. The process of claim 27 wherein $R'_5$ is $-R_7-NR_8-$; $R_5$ is $-NR_8-R_7-$; and $R_7$ is a linear alkylene group $-(CH_2)-_q$.

32. The process of claim 31 wherein $R_6$ and $R_8$ are hydrogen and p is 4.

33. The composition of claim 3 in which component (c) is a linear polysiloxane-polylactone block copolymer having the formula:

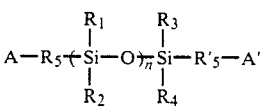

where n is an integer from 1 to about 200; $R_1$, $R_2$, $R_3$ and $R_4$ are independently selected from linear and branched alkyl, alkenyl, haloalkyl, and haloalkenyl of 1 to 6 carbon atoms, aryl of 5 to 7 carbon atoms, aralkyl of 6 to 8 carbon atoms;

A and A' are independently

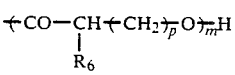

in which p is an integer from 0 to 6; m is an integer from 1 to about 250; $R_6$ is hydrogen or linear or branched alkyl of 1 to 6 carbon atoms;

$R'_5$ is

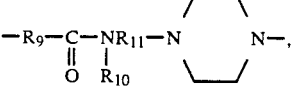

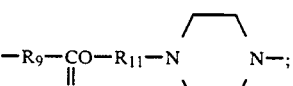

$R_5$ is

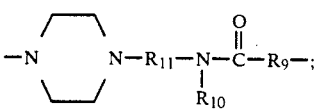

-continued

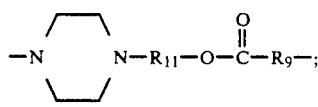

$R_7$, $R_9$ and $R_{11}$ are independently $(CH_2)_q$, in which q is an integer from 1 to 20;

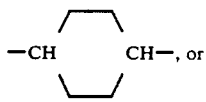

-continued

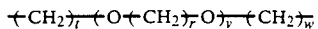

where r, t and w are independently integers from 1 to 6 and v is an integer from 1 to about 100; $R_8$ and $R_{10}$ are independently hydrogen or alkyl of 1 to 6 carbon atoms.

34. The composition of claim 1 in which the filler comprises silica.

35. The composition of claim 6 in which the filler comprises silica.

36. The composition of claim 6 in which each of $R_1$, $R_2$, $R_3$, and $R_4$ is methyl.

37. The composition of claim 1 in which the epoxy resin is an epoxidized orthocresol novolac.

38. The composition of claim 1 in which the epoxy resin is 3,3',5,5'-tetramethylbiphenyl (4,4'-diglycidyl ether).

* * * * *

UNITED STATES PATENT AND TRADEMARK OFFICE
CERTIFICATE OF CORRECTION

PATENT NO. : 5,037,898
DATED : August 6, 1991
INVENTOR(S) : Kailash C. B. Dangayach and Ronald S. Bauer It is certified that error appears in the above-identified patent and that said Letters Patent is hereby corrected as shown below:

On the Title page, in the title, "THERMOSTAT" should read --THERMOSET--.

On the Title page, application number, "185,670" should read --485,670--.

In column 8, line 11, column 9, lines 43 and 60, and column 10, line 27, "tetramethylbiphenyl", each occurrence, should read --tetramethylbiphenol--.

In column 17, line 5, "novolacs, blocked isocyanates" should read --novolacs, anhydrides, blocked isocyanates--.

Signed and Sealed this

Twenty-sixth Day of January, 1993

Attest:

STEPHEN G. KUNIN

Attesting Officer

Acting Commissioner of Patents and Trademarks